United States Patent [19]

Sibley

[11] Patent Number: 5,626,096
[45] Date of Patent: May 6, 1997

[54] TRUCK TIRE CATTLE FEEDER

[76] Inventor: Jerry D. Sibley, 537 Sandy Point Rd., Campti, La. 71411

[21] Appl. No.: 518,827

[22] Filed: Aug. 24, 1995

Related U.S. Application Data

[63] Continuation-in-part of Ser. No. 196,655, Jun. 6, 1994, abandoned.
[51] Int. Cl.[6] ............................................. A01K 5/00
[52] U.S. Cl. ................................................. 119/61
[58] Field of Search ........................ 119/61, 51.03, 119/72, 74, 75, 77, 51.01, 52.1

[56] References Cited

U.S. PATENT DOCUMENTS

| | | | |
|---|---|---|---|
| 2,592,638 | 4/1952 | Andrew | 119/61 |
| 3,074,377 | 1/1963 | Spencer | 119/61 |
| 4,364,335 | 12/1982 | Livingston | 119/61 |
| 5,479,882 | 1/1996 | Kerner | 119/61 |

*Primary Examiner*—Gene Mancene
*Assistant Examiner*—Thomas Price

[57] ABSTRACT

An improved mineral feeder for cattle utilizing three used truck tires and a metal roof. The mineral feeder design uses the durability and weight of truck tires to resist the abuse from cattle and ill effects of corrosion on the feeder while protecting the mineral from rain and spilling.

1 Claim, 5 Drawing Sheets

TRUCK TIRE CATTLE FEEDER

This application is a continuation in part of Ser. No. 08/196,655 filed Jun. 6, 1994, now abandoned.

BACKGROUND OF THE INVENTION

The invention relates to agricultural equipment and, more particularly, pertains to mineral feeders for cattle.

DESCRIPTION OF THE PRIOR ART

Prior art mineral feeders are of several types and designs with each having one or more faults that limit their serviceability.

Instability and lack of durability results from a high center of gravity and being constructed from light weight material. Replacing spilled mineral and torn up mineral feeders is an expensive problem for cattlemen.

The useful life of prior art mineral feeders is limited by rust and corrosion of metal parts that are in contact with salt which is necessary in the diet of cattle.

Some prior art mineral feeders allow only one cow to eat at a time. This can deprive some cattle of an opportunity to eat minerals.

The present invention overcomes faults of prior art by utilizing P.V.C. plastic and used truck tires bolted together with bolts, nuts and washers made of stainless steel. These materials resist rust and corrosion.

The weight, flexibility and durability of truck tires makes it possible to have a low center of gravity and shock absorbing strength to cope with abuse received from cattle butting the mineral feeder. The low center of gravity increases stability of the feeder so that cattle can not turn it over. This stability supplies support for a large flat roof instead of a small bonnet shaped roof that limits access to mineral to one animal at a time.

SUMMARY OF THE INVENTION

It is an object of the invention to provide a movable mineral feeder that will allow cattle access to minerals while protecting the mineral from spilling and rain.

A further object of the invention is to provide the most durable and serviceable mineral feeder at the lowest cost. This is accomplished by utilizing used truck tires as the major building component.

In actual farm tests this feeder has proven to be durable and serviceable thus solving one of the problems confronting the dairy and beef cattle industry while recycling used truck tires.

BRIEF DESCRIPTION OF THE DRAWINGS

The present invention will be more fully understood by reference to the following detailed description thereof when read in conjunction with the attached drawings, and wherein.

DETAILED DESCRIPTION OF THE DRAWINGS

Figure 1:
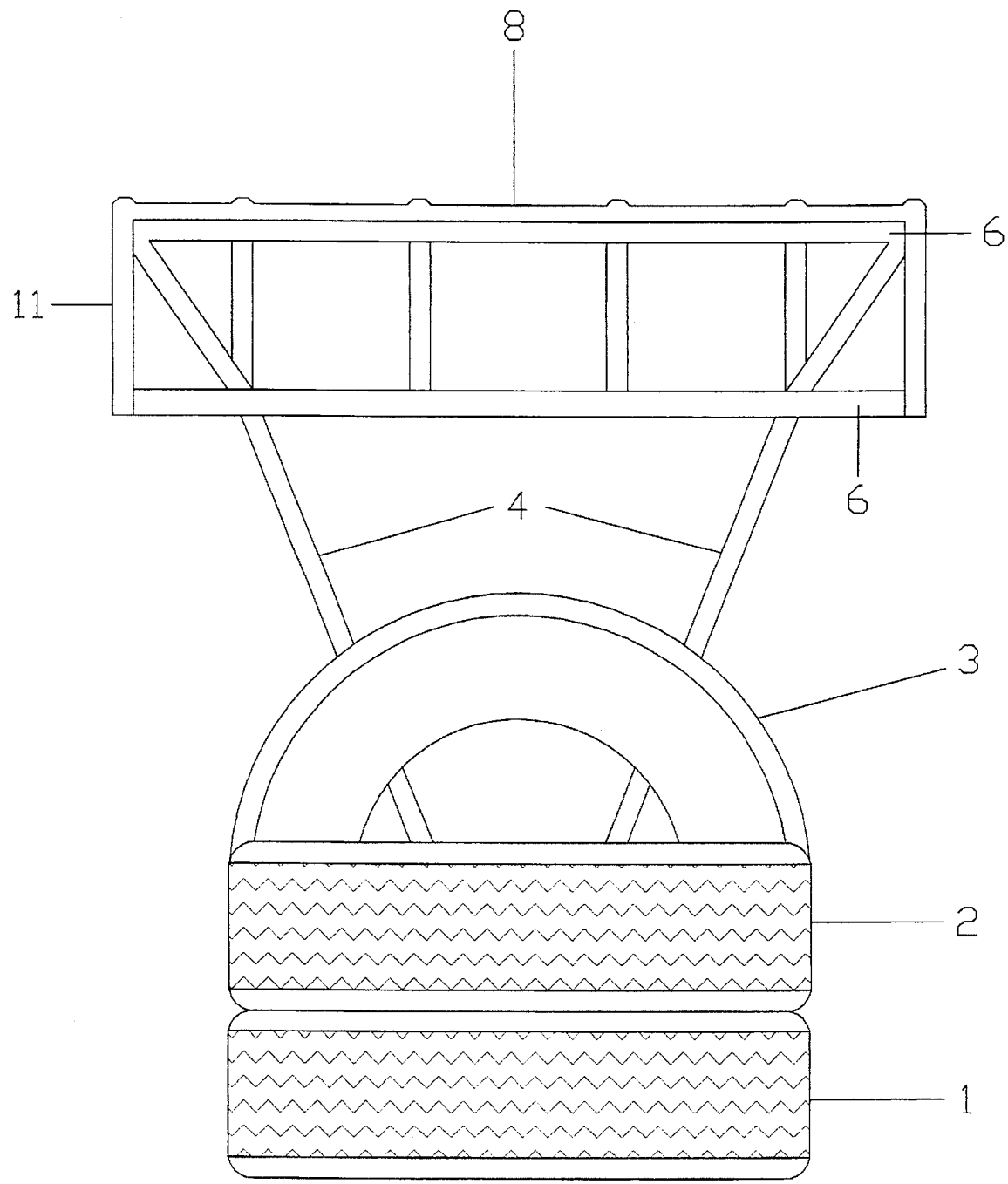
FIG. 1 illustrates a front view of the mineral feeder.

FIG. 1 which illustrates a front view of the mineral feeder shows the position of tire 1 and tire 2 to form the base. The roof 11 is comprised of metal roofing material 8 fastened to steel frame 6.

Figure 2:
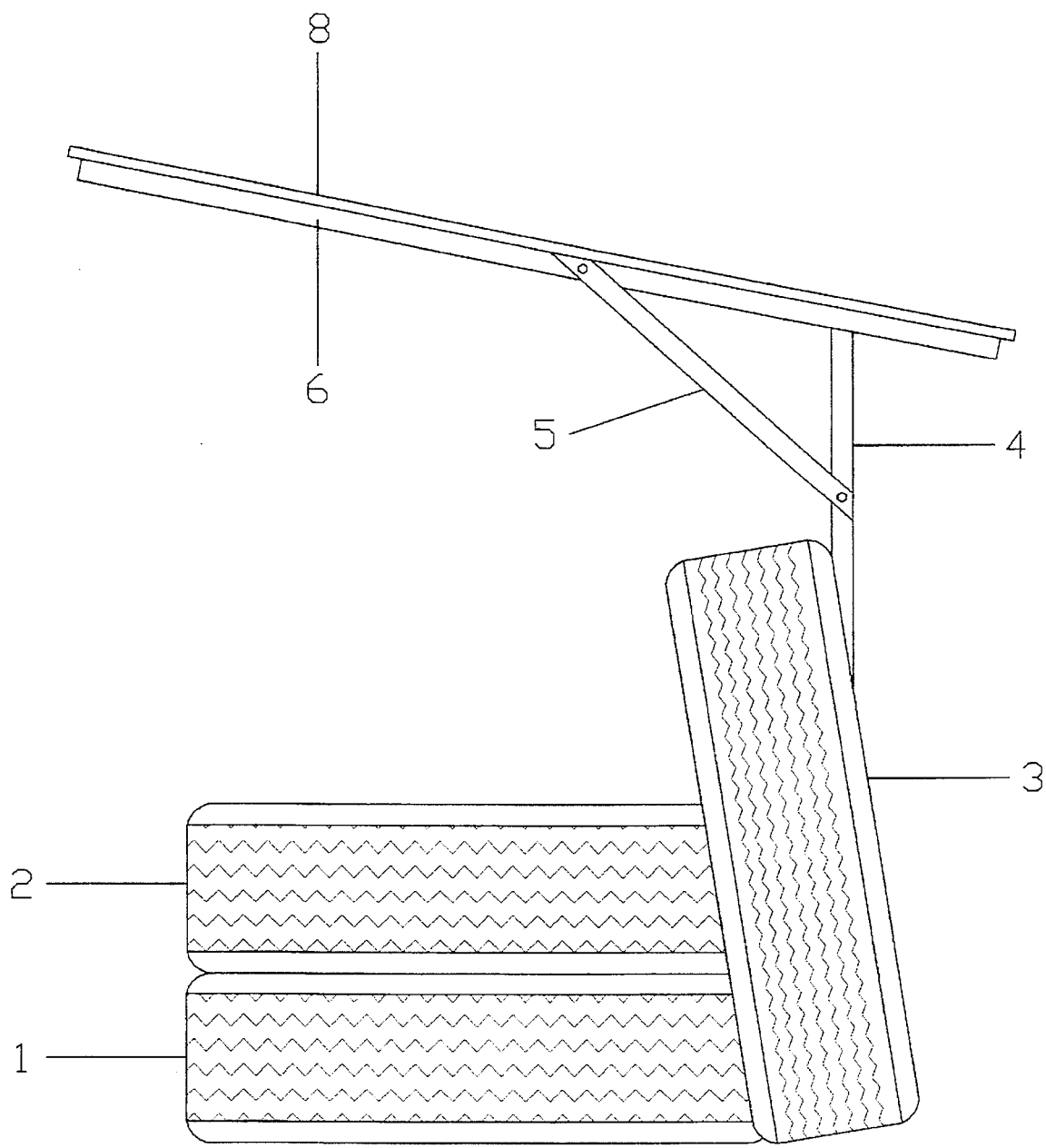
FIG. 2 illustrates a side view of the mineral feeder.
Figure 3:
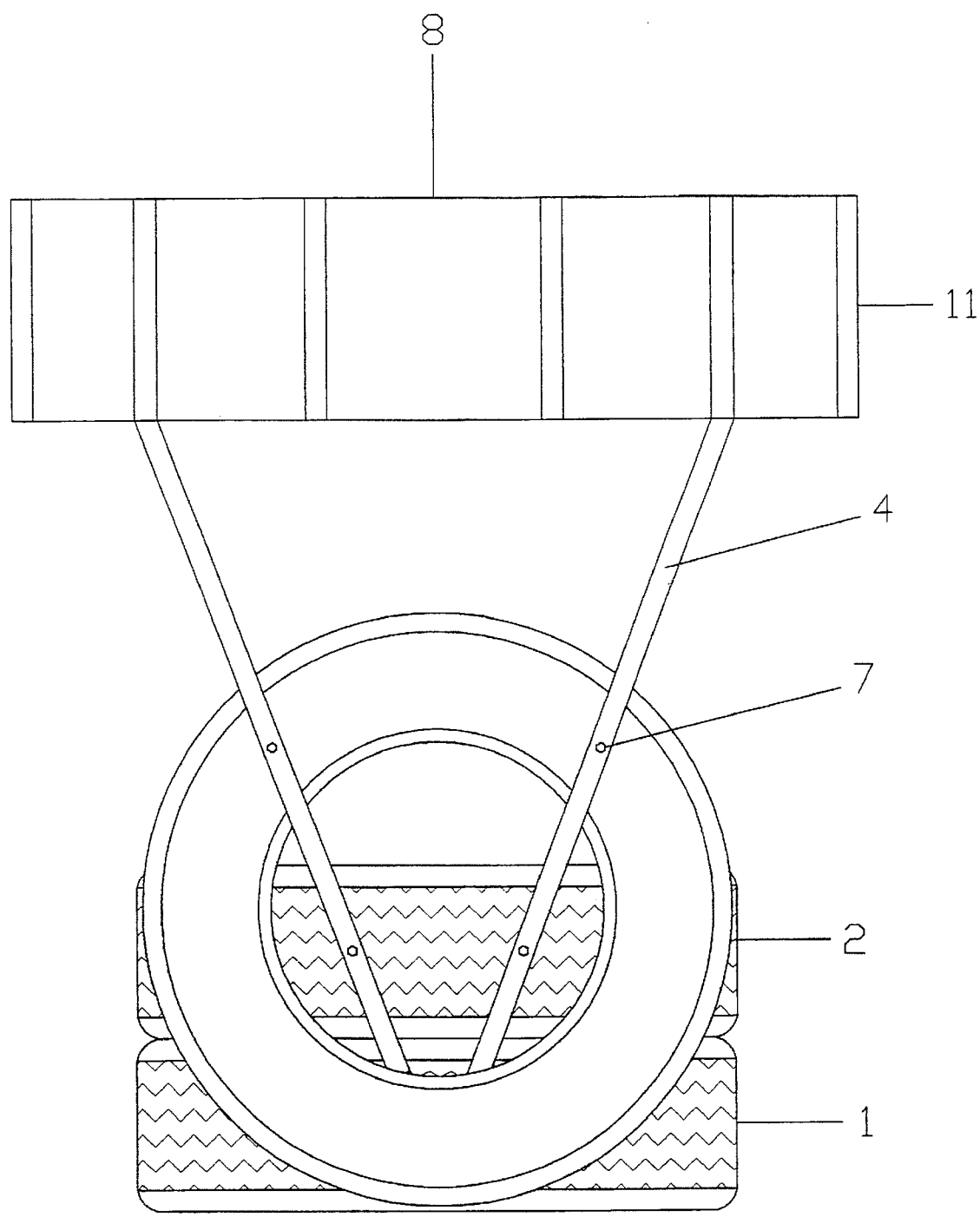
FIG. 3 illustrates a back view of the mineral feeder.

FIG. 2 which illustrates a side view of the mineral feeder including the support of roof 11 by tire 3 and angle iron roof support 4. Brace 5 is bolted to roof frame 6 and angle iron roof support 4.

Figure 4A:
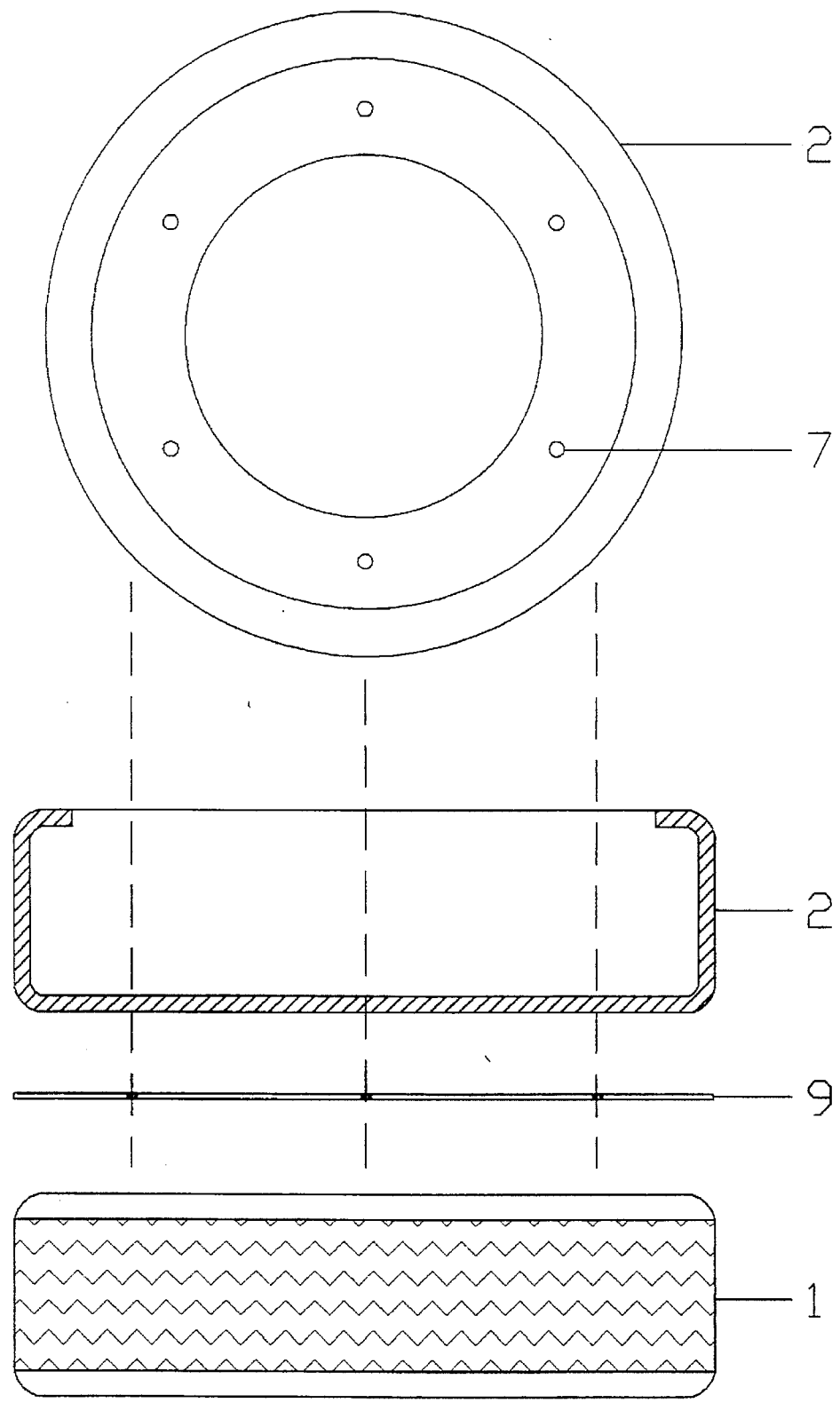
FIG. 4A and 4B illustrates the assembly of the mineral feeder.

FIG. 4A illustrates the assembly of the feeder shows a circular piece of ⅛ inch thick sheet P.V.C. plastic 9 being placed between tire 1 and tire 2 of the base. Bolts, washers and nuts which are made of stainless steel comprise multiple fastening devices 7 that passes through the upper sidewall of tire 1, a circular piece of ⅛ inch thick sheet P.V.C. plastic 9, and the lower sidewall of tire 2. Tire 2 becomes an open top mineral container when part of the upper sidewall and rim bead is cut away.

Figure 4B:
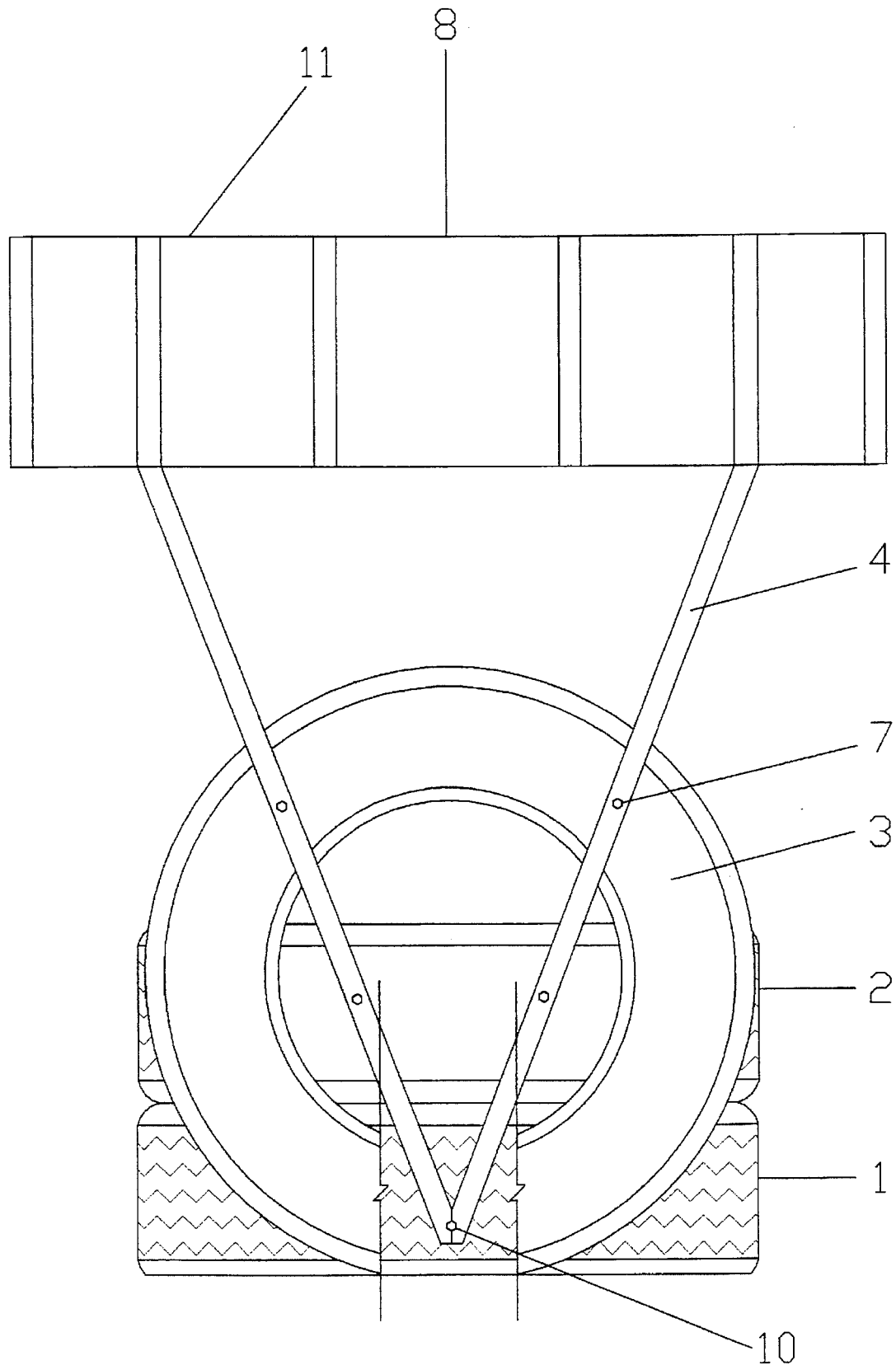

FIG. 4B illustrates fastening devices 7 fastening angle iron roof support 4 to tire 3 and tire 1 near weld 10. Also angle iron roof support 4 is shown being fastened to tire 2 and tire 3 with fastening devices 7.

I claim:

1. A mineral feeder utilizing used truck tires, said mineral feeder allowing cattle access to mineral which said mineral feeder contains while protecting mineral from rain and spilling due to actions of cattle upon said mineral feeder comprising:

(a) means for a stable and durable base including two used truck tires laid horizontally on top of each other and bolted together through contacting sidewalls;

(b) means for containing mineral including containing area formed by cutting away upper rim bead and part of upper sidewall of upper used truck tire of base, said containing means including separating cavities of two used truck tires that comprise base by a partition being a flat piece of material between sidewalls of two used truck tires comprising base;

(c) means for shock absorbent roof support including a used truck tire tilted from vertical and positioned so that sidewall of said tilted used truck tire contacts treads of two horizontal used truck tires comprising base, said base being bolted to tilted used truck tire at each point of contact;

(d) means for extending height and strengthening of shock absorbent roof support, said means including two pieces of angle iron of equal length with ends connected at an acute angle by weld, said weld being positioned inside tilted used truck tire in such position that one bolt can pass through and connect said two pieces of angle iron near said weld, sidewall of tilted used truck tire and tread of lower used truck tire of base; said base being bolted to angle iron at two other points where tread of upper used truck tire of base makes contact with angle iron; said angle iron being bolted to tilted used truck tire at two points where angle iron contacts sidewall of tilted used truck tire;

(e) means for protecting mineral from rain, said protecting means including a metal roof, said metal roof including metal roofing material and steel frame fastened together, said metal roof being bolted and braced to means for extending height and strengthening of shock absorbent roof support.

* * * * *